(12) United States Patent
Stephan et al.

(10) Patent No.: US 8,577,542 B2
(45) Date of Patent: Nov. 5, 2013

(54) METHOD FOR DETECTING CHANGES IN THE RIGIDITY OF A HYDRAULIC BRAKE SYSTEM

(75) Inventors: Thilo Stephan, Heilbronn (DE); Ralf Kinder, Backnang (DE); Dirk Mahnkopf, Eglosheim (DE)

(73) Assignee: Robert Bosch GmbH, Stuttgart (DE)

( * ) Notice: Subject to any disclaimer, the term of this patent is extended or adjusted under 35 U.S.C. 154(b) by 497 days.

(21) Appl. No.: 12/735,839

(22) PCT Filed: Nov. 26, 2008

(86) PCT No.: PCT/EP2008/066176
§ 371 (c)(1),
(2), (4) Date: Nov. 3, 2010

(87) PCT Pub. No.: WO2009/112106
PCT Pub. Date: Sep. 17, 2009

(65) Prior Publication Data
US 2011/0040439 A1    Feb. 17, 2011

(30) Foreign Application Priority Data
Mar. 12, 2008    (DE) .......................... 10 2008 000 628

(51) Int. Cl.
*B60T 17/22*    (2006.01)
(52) U.S. Cl.
USPC .......................................... 701/31.4; 701/37
(58) Field of Classification Search
USPC ............ 701/29.4, 37, 38; 301/114.1, DIG. 2, 301/DIG. 4, DIG. 1, 119.1, 116.1, 122.03, 301/112, 166, 186, 199, 113.4, 122.09, 301/122.13, 122.11, 113.3; 60/552, 581, 60/547.3, 550, 582, 562, 545, 553, 534, 60/576, 591; 188/181 T
See application file for complete search history.

(56) References Cited

U.S. PATENT DOCUMENTS

| | | | |
|---|---|---|---|
| 6,318,817 B1* | 11/2001 | Martin et al. | 303/116.1 |
| 6,739,676 B1* | 5/2004 | Isono et al. | 303/114.3 |
| 2003/0090149 A1 | 5/2003 | Kusano et al. | |
| 2004/0090347 A1 | 5/2004 | Yoshino et al. | |
| 2005/0146211 A1 | 7/2005 | Nakano | |
| 2005/0156465 A1* | 7/2005 | Gronau et al. | 303/114.3 |
| 2005/0231034 A1* | 10/2005 | Kerns et al. | 303/191 |
| 2006/0151265 A1* | 7/2006 | Honjou et al. | 188/170 |
| 2007/0001508 A1* | 1/2007 | Schluter | 303/114.3 |

FOREIGN PATENT DOCUMENTS

| | | |
|---|---|---|
| CN | 101132959 | 2/2008 |
| JP | 2003-127849 | 5/2003 |

\* cited by examiner

*Primary Examiner* — Marthe Marc-Coleman
(74) *Attorney, Agent, or Firm* — Kenyon & Kenyon LLP

(57) ABSTRACT

In a method for detecting air in the brake circuit of a motor vehicle having a hydraulic brake system that has a vacuum brake booster, the pressure prevailing in the vacuum chamber of the vacuum brake booster in the operated and the non-operated states of the brake is measured, and a parameter characteristic of the brake performance is determined as a function of the measured pressure, and the characteristic parameter is compared to a reference value.

12 Claims, 3 Drawing Sheets

METHOD FOR DETECTING CHANGES IN THE RIGIDITY OF A HYDRAULIC BRAKE SYSTEM

BACKGROUND OF THE INVENTION

1. Field of the Invention

The present invention relates to a method for detecting changes in rigidity of a hydraulic passenger car brake system, as well as a control unit having an algorithm for carrying out the method.

2. Description of Related Art

In known hydraulic passenger car brake systems, changes in the brake characteristics are able to come about especially by air inclusions in the brake fluid. Changes in the brake performance characteristics are normally able to be detected by the driver when operating the brake pedal, since a longer pedal path has to be covered to achieve the same vehicle deceleration. This is only true, however, for the usual hydraulic brake systems, in which a mechanical feedthrough exists between the brake pedal and the brake caliper. By contrast, brake systems in which the brake pedal is mechanically decoupled from the remainder of the brake system give no feedback via the brake pedal.

BRIEF SUMMARY OF THE INVENTION

An object of the present invention is to provide a method by the use of which rigidity changes in brake systems (hydraulic ones and also ones that are decoupled) are able to be detected automatically.

One aspect of the present invention is to measure the pressure prevailing in the vacuum chamber of the vacuum brake booster in the operated and the non-operated state of the brake, and from the measured pressures to calculate a characteristic parameter that is characteristic for the break performance, such as the path covered by the booster diaphragm or the main brake cylinder, the volume displaced by the main brake cylinder or just simply the pressure difference in the two states, and to compare this characteristic variable to a reference value. This makes it possible to detect a change in the rigidity of the brake system based on the measured vacuum chamber pressure alone.

The reference value is preferably calculated as a function of the hydraulic brake pressure (e.g. of the admission pressure) or is determined with the aid of a characteristics curve.

According to one example embodiment of the present invention, the pressure difference between the vacuum chamber pressure in the operated and the non-operated state is calculated and compared to the reference value. The reference value $\Delta p$ may, for instance, be calculated using the following relationship $$\Delta p = p_{FC}^{Rel.} - p_{FC}^{Appl.} = \frac{\left(S_B + \frac{V_{RC}^{Rel.}}{A_B}\right) \cdot \left(\begin{array}{c} p_{MC}^{Appl.} \cdot (A_{MC} + \alpha) + \\ D \cdot S_B + F_0 \end{array}\right)}{V_B} \quad (1)$$

as a function of the hydraulic brake pressure $p_{MC}^{Appl.}$, or ascertained from an appropriate characteristics curve. (For the explanation of the formula, see special figure description).

In the method according to the first example embodiment, the vacuum chamber pressure is preferably first measured in the operated state of the brake, and after that in the non-operated state.

According to a second example embodiment of the present invention, the path covered by the diaphragm of the vacuum brake booster, or a quantity proportional to it, is determined as a function of the measured vacuum chamber pressures in the operated and the non-operated state. The path s covered by the diaphragm may be ascertained, for instance, according to the following relationship:

$$S_B^{Appl.} = \frac{V_{FC}^{Rel.} - V_{FC}^{Appl.}}{A_B} = \frac{V_{FC}^{Rel.}}{A_B} \cdot \left[1 - \left(\frac{r_{FC}^{Rel.}}{p_{FC}^{Appl.}}\right)^{1/\kappa}\right] \quad (2)$$

(For the explanation of the formula, see special figure description).

From the path s thus calculated, a volume displaced by the main brake cylinder is preferably calculated. This volume $V_{MC}$ may be calculated as follows, for instance:

$$V_{MC} = A_{MC} \cdot (S_B^{Appl.} - S_0) \quad (3)$$

Volume $V_{MC}$ determined from the vacuum pressures is preferably compared to a volume ascertained from a p/V characteristics line. If the deviation is greater than a specified threshold value, a change in the rigidity of the brake system is detected. This may be displayed to the driver, for example, using a control lamp or another device.

DETAILED DESCRIPTION OF THE INVENTION

Figure 1:
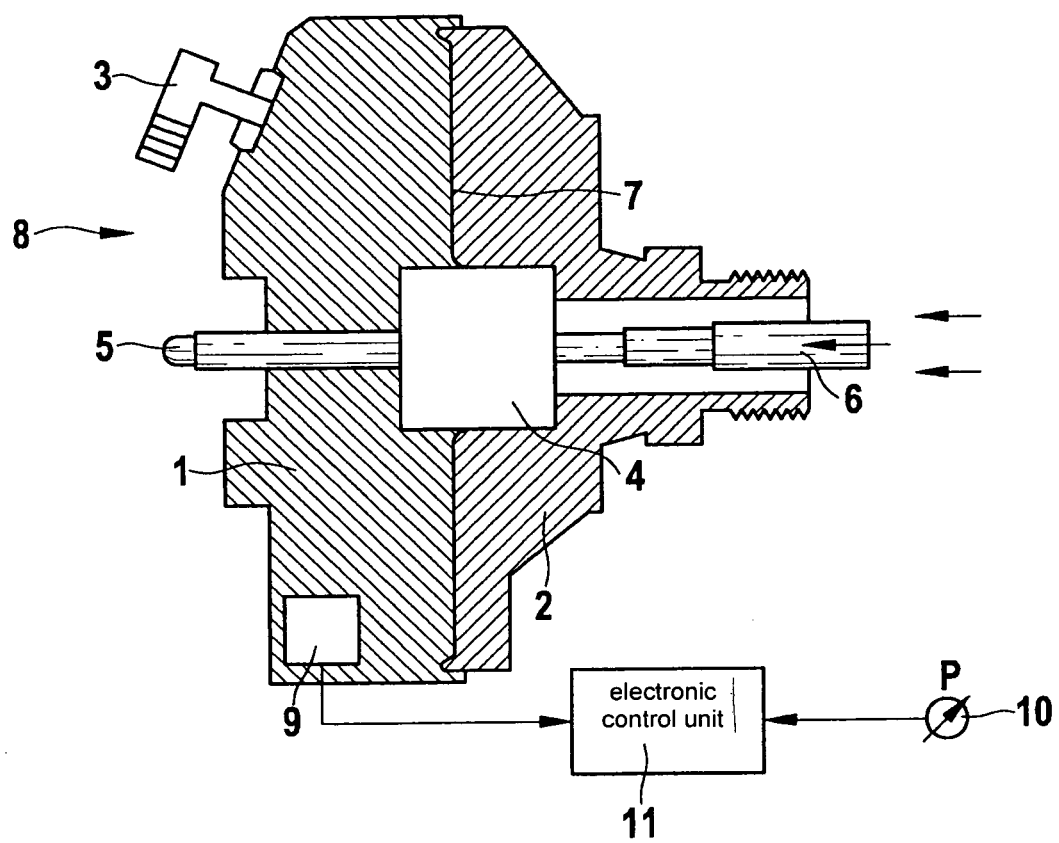
FIG. 1 shows a schematic view of a vacuum brake booster.

FIG. 1 shows a schematic representation of a usual vacuum brake booster (UBKV). The UBKV essentially includes a working chamber 2, a vacuum chamber 1 having a vacuum connection 3 and a diaphragm 7, which is situated between the two chambers 1, 2. A vacuum source (not shown) is connected to vacuum connection 3, which is driven, for instance, by the internal combustion engine, and generates a specified vacuum in vacuum chamber 1. In the central region of UBKV 8 there is a double valve 4 which fulfills two functions, namely a) to separate working chamber 2 from vacuum chamber 1, or to connect the two chambers 1, 2 to each other, and b) to ventilate working chamber 2 or to separate it from the environmental air.

In the non-braked state, the connection between vacuum chamber 1 and working chamber 2 is open. In both chambers 1, 2 there consequently prevails the same vacuum. When the brake pedal is operated, the two chambers 1, 2 are separated from each other and working chamber 2 is ventilated.

As a function of the path set via piston rod 6, a pressure difference sets in between the pressure in vacuum chamber 1 and the environmental pressure. The force resulting from the pressure difference on working diaphragm 7 boosts the brake force via piston rod 6, in this instance. After the release of force F, the ventilation using environmental air is interrupted and the chamber valve is opened again. Because of this, both chambers 1, 2 have a vacuum applied to them by the vacuum source.

In contrast to known UBKV's, the UBKV 8 shown includes a sensor system 9, 10, 11, by which changes in the force-path characteristics of the vacuum brake booster are able to be detected. The sensor system, in this case, includes a pressure sensor 9 situated in vacuum chamber 1, whose output signal is evaluated by a control unit 11, and a pressure sensor 10 for measuring a hydraulic brake pressure (admission pressure), which is also connected to control unit 11.

Variant 1: Determination of the Rigidity when the Brake Pedal is Released

According to a first example embodiment of the present invention, the pressure prevailing in vacuum chamber 1 is first measured in the operated state and then in the released state of the brake, and a pressure difference is formed from this. This pressure difference is finally compared to a reference value.

Figure 2:
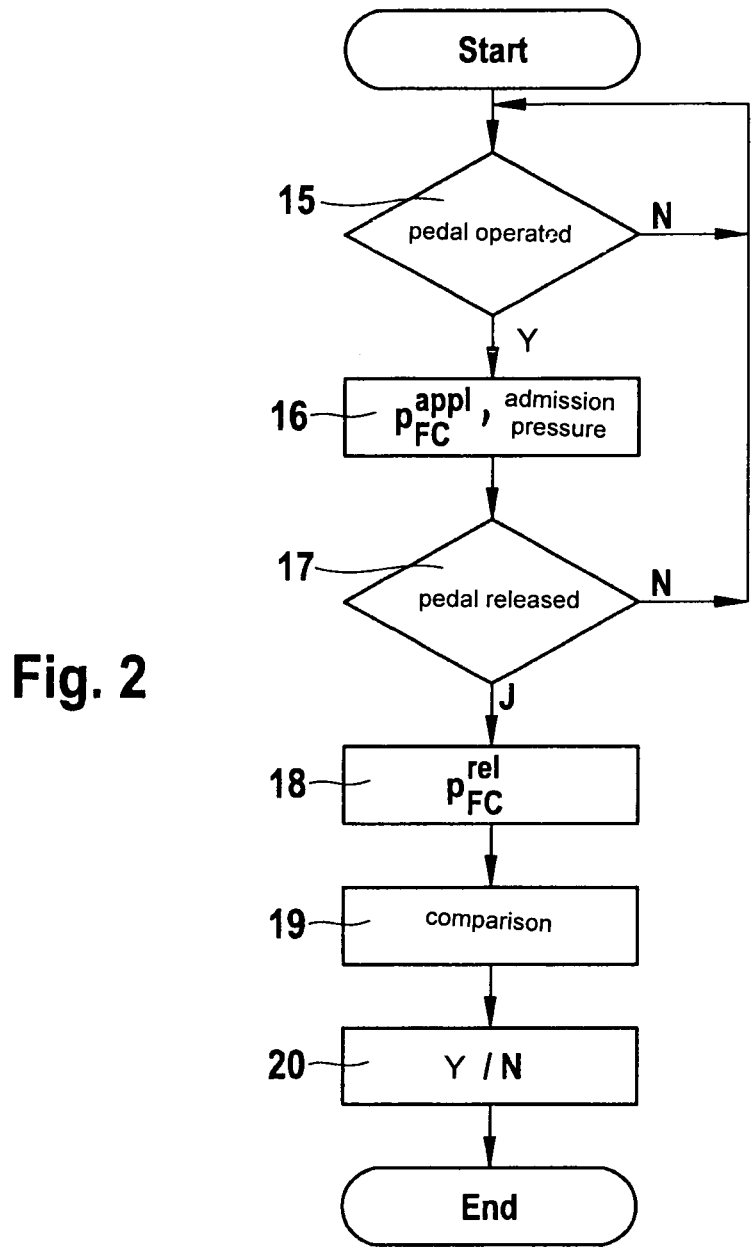
FIG. 2 shows a flow chart of the steps of a method for detecting changes in the rigidity of a break system, according to a first example embodiment.
Figure 3:
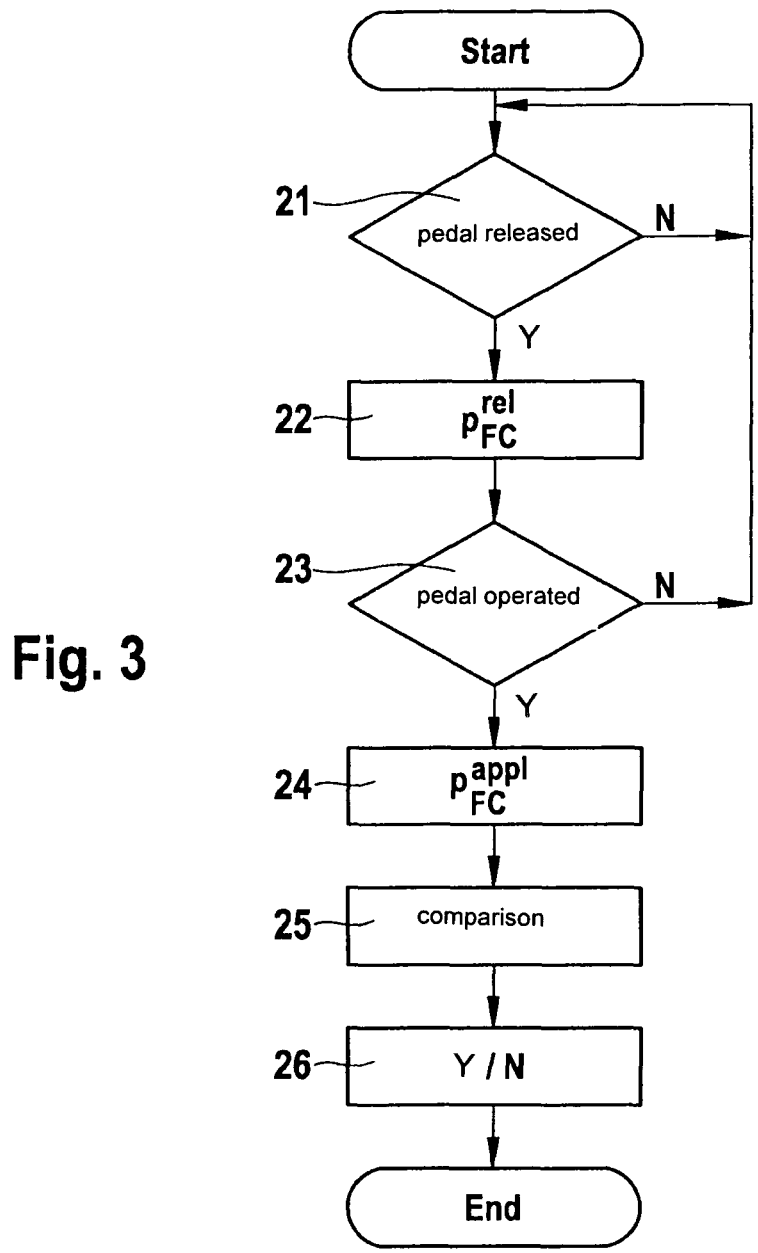
FIG. 3 shows a flow chart the steps of a method for detecting changes in the rigidity of a break system, according to a second example embodiment.

FIG. 2 shows the method steps of this method.

In step 15 it is first monitored whether the foot brake pedal has been operated and held constant over a predefined short time period, for instance, at least 500 ms. In addition, it is checked whether the vacuum prevailing in vacuum chamber 1 is constant. If both conditions are satisfied, in step 16 a measurement takes place of the vacuum $p_{FC}^{appl}$ in vacuum chamber 1 (the subscript appl=applied or operated, FC=front chamber or vacuum chamber), as well as of the hydraulic brake pressure $p_{MC}^{appl}$ (subscript MC=master cylinder or main brake cylinder).

In the following step 17 it is monitored whether the direction of motion of the pedal is changing and the brake is released. When the foot brake pedal is released for a predefined short time, and the pressure prevailing in vacuum chamber 1 is constant over a predefined time period, in step 18 a pressure measured value $p_{FC}^{Rel.}$ (superscript Rel=released), is taken up, on which the following calculation is based.

In step 19 the pressure difference $\Delta p = p_{FC}^{Rel.} - p_{FC}^{Appl.}$ is then formed from the two measured values.

The following equation is applied for the reference value:

$$p_{FC}^{Rel.} - p_{FC}^{Appl.} = \frac{\left(S_B + \frac{V_{RC}^{Rel.}}{A_B}\right) \cdot \left(p_{MC}^{Appl.} \cdot (A_{MC} + \alpha) + D \cdot S_B + F_0\right)}{V_B} \quad (1)$$

In the equation, α denotes the pressure-dependent friction of the seals in the brake cylinder, $V_{RC}^{Ref.}$ the volume of the rear chamber when the brake is in a released state, D the force of the springs and the pressure-dependent friction, and $F_0$ the initial force which has to be present via a pressure difference at diaphragm 7 before the diaphragm moves from its position of rest. Furthermore, $A_{MC}$ is the effective area of the main brake cylinder and $s_B$ is the path covered by the diaphragm or the main brake cylinder.

Formula (1) may be derived from the following considerations. For the entire air volume $V_B$ in vacuum brake booster 8, the following applies:

$$V_B = \text{const.} = V_{FC}^{Rel.} + V_{RC}^{Rel.} = V_{FC}^{Appl.} + V_{RC}^{Appl.} \quad (4)$$

$$p_{FC}^{Rel.} \cdot V_B = p_{FC}^{Appl.} \cdot V_{FC}^{Appl.} + p_{RC}^{Appl.} \cdot V_{RC}^{Appl.} \quad (4)$$

In equation (4) it was assumed that the connection of vacuum chamber 1 to the vacuum supply was interrupted during the discharge. If this is not the case, the pressure of vacuum supply $p_{vac}$ is first determined by measuring the pressure in vacuum chamber 1, while the vacuum brake booster is not being operated. During the discharge, the pressure in vacuum chamber 1 is constantly measured. From the difference of chamber pressure $p_{RC}$ and the vacuum pressure, the air mass flowing out during the discharge is able to be determined:

$$\Delta m = A_d \int \Psi(p_{RC}, p_{vac}) dt$$

using the function:

$$\psi = \text{const.} = p_0 \sqrt{\frac{2}{RT}} \sqrt{\frac{\kappa}{\kappa+1}} \left(\frac{2}{\kappa+1}\right)^{\frac{1}{\kappa-1}} \text{ for } p_{vac} < p_{RC}\left(\frac{2}{\kappa}\right)^{\frac{\kappa}{\kappa+1}}$$

$$\psi = p_0 \sqrt{\frac{2}{RT}} \sqrt{\frac{\kappa}{\kappa-1}} \sqrt{\left(\frac{p_{vac}}{p_{RC}}\right)^{\frac{2}{\kappa}} - \left(\frac{p_{vac}}{p_{RC}}\right)^{\frac{\kappa+1}{\kappa}}} \text{ for } p_{vac} \geq p_{RC}\left(\frac{2}{\kappa}\right)^{\frac{\kappa}{\kappa+1}}$$

In order to be able to calculate the displacement $s_B$ of diaphragm 7 from equation (5), the pressure $p_{RC}^{Appl.}$ prevailing in working chamber (subscript RC=rear chamber) has to be determined in the operated state. For this, we observe the force equilibrium between the main brake cylinder and diaphragm 7 in the operated state:

$$p_{MC}^{Appl.} \cdot A_{MC} + p_{MC}^{Appl.} \cdot \alpha + D \cdot S_B + F_0 = A_B(p_{RC}^{Appl.} - p_{FC}^{Appl.}) \quad (6)$$

In the equation, α denotes the pressure-dependent friction of the seals in the brake cylinder, D the force of the springs (diaphragm and main brake cylinder) and the path-dependent friction, and $F_0$, the initial force, which has to be present via a pressure difference at diaphragm 7 before the diaphragm moves from its position of rest.

Equation (6) applies only for systems not having mechanical coupling. In the case of the usual vacuum brake boosters, the equation should be modified to the extent that input force $F_{in}$ is taken into consideration:

$$p_{MC}^{Appl.} \cdot A_{MC} + p_{MC}^{Appl.} \cdot \alpha + D \cdot S_B + F_0 = A_B(p_{RC}^{Appl.} - p_{FC}^{Appl.}) + F_{in}$$

Provided the saturation point of the vacuum brake booster has not been reached (which may be detected on $p_{MC}$) the boosting may be approximated linearly:

$$A_B(p_{RC}^{Appl.} - p_{FC}^{Appl.}) = \beta F_{in}$$

using boost factor β. Now, if the quantity $A_B$ is replaced by $$A_B\left(1 + \frac{1}{\beta}\right),$$

equation (6) keeps its validity even in the case of the usual vacuum brake boosters.

From equations (5) and (6) one may now calculate path $s_B$ of diaphragm 7 during the release of the pedal:

$$S_B = -\left(\frac{A_B}{2 \cdot D} \cdot X + \frac{V_{RC}^{Rel.}}{2 \cdot A_B}\right) + \sqrt{\frac{\left(\frac{A_B}{2 \cdot D} \cdot X + \frac{V_{RC}^{Rel.}}{2 \cdot A_B}\right) + }{(p_{FC}^{Rel.} - p_{FC}^{Appl.}) \cdot V_B - V_{RC}^{Rel.} \cdot X}{D}} \quad (7)$$

$$X := \frac{p_{MC}^{Appl.} \cdot (A_{MC} + \alpha) + F_0}{A_B} \quad (8)$$

Path $s_B$, calculated from equations (7) and (8) could be directly compared (or rather, after recalculating of path $s_B$ into a volume V) to the pV characteristics curve for the brake system. From the difference of the two values one could consequently determine whether air inclusions are present or not.

Since, however, formula (7) in its present form can only be calculated with great effort in a control unit, and since, for the application, it is only of interest when the volume take-up in the brake system is exceeding a certain limit, we propose the following procedure.

First, equations (7) and (8) are solved according to pressure difference $p_{FC}^{Rel.} - p_{FC}^{Appl.}$ operated and released state, so that the following equation is obtained:

$$p_{FC}^{Rel.} - p_{FC}^{Appl.} = \frac{\left(S_B + \frac{V_{RC}^{Rel.}}{A_B}\right) \cdot \left(p_{MC}^{Appl.} \cdot (A_{MC} + \alpha) + D \cdot S_B + F_0\right)}{V_B} \quad (9)$$

In this equation, only path $s_B$, covered by the main cylinder, is unknown. This quantity may be determined via the following equation, as a function of the hydraulic admission pressure $p_{MC}$ and from the pV characteristics curve of the evacuated brake system $V_{MC} = V_{MC}^{NoAir}(p_{MC})$.

Consequently, formula (9) is only still a function of hydraulic pressure $p_{MC}$, and for each measured hydraulic pressure $p_{MC,r}^{Appl.}$ it gives a pertaining value for the pressure difference $\Delta p$ that is to be expected. Consequently, measured pressure difference $\Delta p$ must be compared only to the pressure difference ascertained from characteristics line (9). When these two values differ from each other more than a predefined threshold value, a critical state is detected and a corresponding warning signal is emitted.

Variant 2: Determination of the Rigidity when the Brake Pedal is Operated

According to a second example embodiment, volume $V_{MC}$ displaced in response to the operation of the foot brake pedal by the main brake cylinder is ascertained, and is compared to the pV characteristics curve of the system. For the volume of vacuum chamber 1 (subscript FC) in the operated state (superscript Appl.), the following applies:

$$V_{FC}^{Appl.} = V_{FC}^{Rel.} \cdot \left(\frac{p_{FC}^{Rel.}}{p_{FC}^{Appl.}}\right)^{\frac{1}{\kappa}} \quad (10)$$

where the assumption was made again that the vacuum supply was interrupted. The differential mass may be calculated and taken into account analogously to the preceding case.

In this context, $p_{FC}^{Rel.}$ and $p_{FC}^{Appl.}$ are the pressures in vacuum chamber 1 in the non-operated and the operated state respectively, and k=1 for an isothermal change in state. Then the following applies for the path $S_B^{Appl.}$ covered by diaphragm 7:

$$S_B^{Appl.} = \frac{V_{FC}^{Rel.} - V_{FC}^{Appl.}}{A_B} = \frac{V_{FC}^{Rel.}}{A_B} \cdot \left[1 - \left(\frac{p_{FC}^{Rel.}}{p_{FC}^{Appl.}}\right)^{\frac{1}{\kappa}}\right] \quad (11)$$

where $A_B$ is the effective area of diaphragm 7. The volume $V_{MC}$ displaced by the main cylinder may now be calculated from cross sectional area $A_{MC}$ of the main brake cylinder and path $s_B^{Appl.}$, since the path covered in main brake cylinder 8 is thus identical to the path of diaphragm 7, minus some free play $s_0$, until a pressure build-up takes place in the main brake cylinder (MC). The following applies:

$$V_{MC} = A_{MC} \cdot (S_B^{Appl.} - S_0) \quad (12)$$

From a comparison of $V_{MC}$ to the pV characteristics curve of the evacuated brake system $V_{MC} = V_{MC}^{NoAir}(P_{MC})$, one is able to establish whether there is air inclusion in the brake system.

What is claimed is:

1. A method for detecting changes in the rigidity of a hydraulic brake system having a vacuum brake booster, comprising:
   operating a brake and holding the brake constant over a first predefined period of time to determine an operated state of the brake;
   releasing the brake for a second predefined period of time to determine a non-operated state of the brake;
   measuring, in each of consecutive operated state and non-operated state of the brake, a pressure prevailing in a vacuum chamber of the vacuum brake booster, wherein the vacuum chamber includes a diaphragm;
   ascertaining, as a function of the measured vacuum chamber pressures in each of the consecutive operated state and non-operated state of the brake, a characteristic parameter characterizing the brake performance; and
   comparing the characteristic parameter to a reference value.

2. The method as recited in claim 1, wherein a pressure difference between the measured vacuum chamber pressures in the operated state and the non-operated state of the brake is calculated as the characteristic parameter and is compared to the reference value.

3. The method as recited in claim 2, wherein the reference value is ascertained as a function of a hydraulic brake pressure.

4. The method as recited in claim 3, wherein the reference value is ascertained from the following relationship:

$$p_{FC}^{Rel.} - p_{FC}^{Appl.} = \frac{\left(S_B + \frac{V_{RC}^{Rel.}}{A_B}\right) \cdot \left(p_{MC}^{Appl.} \cdot (A_{MC} + \alpha) + D \cdot S_B + F_0\right)}{V_B}.$$

5. The method as recited in claim 4, wherein a path covered by the diaphragm is determined with the aid of a stored characteristic curve.

6. The method as recited in claim 1, wherein the vacuum chamber pressure is first measured in the operated state of the brake and subsequently measured in the non-operated state of the brake.

7. The method as recited in claim 1, wherein one of the path covered by the diaphragm or a quantity proportional to the path covered by the diaphragm is determined as a function of the measured vacuum chamber pressures.

8. The method as recited in claim 7, wherein the path covered by the diaphragm is calculated from the following relationship:

$$S_B^{Appl.} = \frac{V_{FC}^{Rel.} - V_{FC}^{Appl.}}{A_B} = \frac{V_{FC}^{Rel.}}{A_B} \cdot \left[1 - \left(\frac{p_{FC}^{Rel.}}{p_{FC}^{Appl.}}\right)^{\frac{1}{\kappa}}\right].$$

9. The method as recited in claim 8, wherein a volume displaced from a main brake cylinder is determined based on the path covered by the diaphragm.

10. The method as recited in claim 9, wherein the volume displaced from the main brake cylinder is calculated from the following relationship:

$$V_{MC}=A_{MC} \cdot (S_B^{Appl.}-S_0)$$

wherein $V_{MC}$ is the volume displaced from the main brake cylinder, $A_{MC}$ is a cross-sectional area of the main brake cylinder, and $S_0$ is a predetermined tolerance value.

11. The method as recited in claim 10, wherein the calculated volume displaced from the main brake cylinder is compared to a corresponding volume displaced from the main brake cylinder as ascertained from a pressure-volume characteristics curve.

12. A control unit for detecting changes in the rigidity of a hydraulic brake system having a vacuum brake booster, comprising:
- a measuring arrangement configured to measure, in each of consecutive operated state and non-operated state of the brake, a pressure prevailing in a vacuum chamber of the vacuum brake booster, wherein the vacuum chamber includes a diaphragm;
- an ascertaining arrangement configured to ascertain, as a function of the measured vacuum chamber pressures in each of the consecutive operated state and non-operated state of the brake, a characteristic parameter characterizing the brake performance; and
- comparing unit configured to compare the characteristic parameter to a reference value,
- wherein the operated state is determined when the brake is operated and held over a first predefined period of time, and the non-operated state is determined when the brake is released for a second predefined period of time.

* * * * *

UNITED STATES PATENT AND TRADEMARK OFFICE
CERTIFICATE OF CORRECTION

PATENT NO.       : 8,577,542 B2                                           Page 1 of 1
APPLICATION NO.  : 12/735839
DATED            : November 5, 2013
INVENTOR(S)      : Stephan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 548 days.

Signed and Sealed this
Twenty-second Day of September, 2015

Michelle K. Lee
*Director of the United States Patent and Trademark Office*